United States Patent Office 3,420,920
Patented Jan. 7, 1969

---

3,420,920
TRICHLOROCYCLOPENTYL AND TRICHLOROCYCLOHEXYL PHOSPHATES AND PHOSPHONATES AND PROCESS THEREFOR
Rudi F. W. Rätz, Hamden, and Miriam J. Gruber, New Haven, Conn., assignors, by mesne assignments, to The Ansul Company, a corporation of Wisconsin
No Drawing. Filed Sept. 30, 1965, Ser. No. 491,835
U.S. Cl. 260—941                    10 Claims
Int. Cl. C07f 9/02; C07f 9/38; A01n 9/36

---

ABSTRACT OF THE DISCLOSURE

Trichlorocyclopentyl and trichlorocyclohexyl phosphates and phosphonates having the formula:

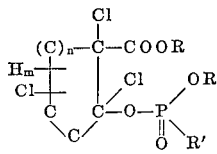

where R is lower alkyl; R' is lower alkyl, lower alkoxy, or chloromethyl; n is an integer from 1–2, and m is 5 or 7 being 5 when n is 1 and 7 when n is 2, are prepared by the exhaustive chlorination of selected cyclic vinyl phosphates and phosphonates. These compounds are unusually effective contact and systemic insecticides.

---

This invention relates to a series of trichlorocyclopentyl and trichlorocyclohexyl phosphates and phosphonates, and more specifically it relates to organophosphorus derivatives having the formula:

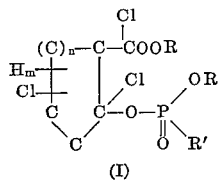

where R is lower alkyl; R' is lower alkyl, lower alkoxy, or chloromethyl; n is an integer from 1–2, and m is 5 or 7 being 5 when n is 1 and 7 when n is 2. As used in the specification and claims herein, the terms "lower alkyl" and "lower alkoxy" relate to moieties having 1–4 carbon atoms.

The derivatives I have been provided in accordance with this invention in high purity and nearly quantitative yield by the exhaustive chlorination of selected cyclic vinyl phosphates and phosphonates. Suitably such phosphates and phosphonates which may be employed as starting reactants in the practice of this invention have the general formula:

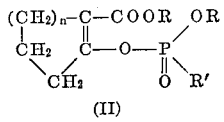

where n, R, and R' are as previously represented. These reactants are available by methods known in the art. For instance, the preparation of cyclic vinyl phosphates suitable for use in this invention is disclosed in U.S. Patent 2,788,358. Similarly, suitable cyclic vinyl phosphonates are conveniently provided by the reaction of alkyl alkanephosphonyl halides with the alkali metal salts of carbalkoxycyclopentanones and cyclohexanones such as for example illustrated in Example 1 hereinafter.

The preparation of the trichlorinated derivatives I by the process described herein is a surprising and unexpected feature of this invention. When bromine is reacted, even in excess molar amounts, with the cyclic compounds II, reaction at the double bond only occurs to provide dibrominated derivatives. However, reaction of chlorine proceeds in a different manner. When equimolar amounts of chlorine and any of the individual cyclic vinyl derivatives II are reacted together, trichlorinated derivatives are provided in mixture with beginning unsaturated compound. In the presence of a molar excess of chlorine, the trichlorinated derivatives I are provided in nearly quantitative yield.

The derivatives I are unusually effective contact and systemic insecticides, and they are characterized, as contrasted to the unsaturated precursors II, with significantly reduced mammalian toxicity. In this regard, their insecticidal activity is somewhat surprising since reaction of the compounds II with bromine yields the aforementioned dibrominated derivatives which are poor insecticides.

The beginning reactants II are oily liquids, and chlorination in accordance with this invention may be performed by passing chlorine into these liquids at a temperature range of 0°–150° C. However, preferred procedure is to carry out the reactions in the presence of an inert diluent, and in this regard, halogenated hydrocarbons such as chloroform, carbon tetrachloride, tetrachloroethylene and the like are suitable diluents. Using these diluents, a preferred chlorination temperature of about 10°–75° C. may be employed. A molar excess of chlorine may be utilized without providing any additional substitution products in addition to the trichlorinated compounds I. No product degradation occurs in the presence of such excess chlorine. Product workup may be conveniently achieved by removing any solvent or other volatiles in vacuo leaving a residual oily product. Several of these products may be vacuum distilled, but since these crude products are of relatively high purity, preferred procedure involves no distillation techniques.

The following examples will serve to illustrate the preparation of several of the compounds included in the general Formula I.

EXAMPLE 1

After the removal of residual moisture from a slurry of 22.2 g. (0.134 mole) of sodium 2-methoxycarbonylcyclopentenolate in 200 ml. of benzene by azeotropic distillation using a Dean-Stark trap, a solution of 17.3 g. (0.134 mole) of methyl methylphosphonochloridate in 60 ml. of benzene was added dropwise with stirring over a period of 30 minutes. The mixture was refluxed for 5 hours. After standing overnight, the formed sodium chloride was removed by filtration and rinsed with ether to give 8.1 g. (calculated amount 7.8 g.). The solvent was removed from the ethereal filtrate and the residue combined with the benzene filtrate. The benzene solvent was removed at reduced pressure. The residue (32.5 g.) was distilled in vacuum to give a forerun of 7.6 g., B.P. 66°–126° C./0.08 mm., and a main fraction of 17.1 g., B.P. 136°–40° C./0.7 mm. (yield: 54.4%). The higher boiling fraction which consisted of already pure product ($n_D^{20}$ 1.4794) was redissolved in 50 ml. of benzene and extracted with three 20 ml. portions of water and one of 5% aqueous sodium bicarbonate solution. After drying over sodium sulfate and removal of the benzene at reduced pressure, the product was redistilled to give a colorless oil, B.P. 138°–141° C./0.5 mm., $n_D^{20}$ 1.4838. The following analytical data revealed that O-methyl-2-methoxycarbonyl-1-cyclopentenyl methylphosphonate had been obtained.

*Analysis.*—Calcd. for $C_9H_{15}O_5P$: C, 46.16; H, 6.46; P, 13.23. Found: C, 45.22; H, 6.58; P, 13.10.

EXAMPLE 2

A stream of chlorine gas was passed into a solution of O,O - dimethyl - 2 - methoxycarbonyl-1-cyclopentenyl phosphate (5.0 g., 0.02 mole) in 40 ml. of carbon tetrachloride for fifteen minutes at room temperature with external cooling. As the chlorine was consumed and hydrogen chloride evolved from the reaction mixture, an intense yellow color developed. This color remained on standing overnight. Excess chlorine and solvent were removed at reduced pressure and the residual product obtained was held at 42° C./0.1 mm. for one hour. The product (6.8 g.) was a clear, almost colorless oil; $n_D^{22.5}$ 1.4852. An infrared spectrum on this material indicated the complete saturation of the

bond which had previously displayed in the starting material a strong absorption at 6.06μ. This product could be vacuum distilled, B.P. 154°–155° C./1.3 mm.; however, the elemental analysis was made on undistilled material. The following analytical data revealed that O,O-dimethyl-2-methoxycarbonyl - 1 - (1,2,X - trichlorocyclopentyl) phosphate had been obtained. Yield: 95.8%.

*Analysis.*—Calcd. for $C_9H_{14}Cl_3O_6P$: C, 30.40; H, 3.97; Cl, 29.92; P, 8.71. Found: C, 29.84; H, 3.80; Cl, 29.60; P, 8.89.

EXAMPLE 3

A stream of chlorine was passed into a solution of O,O-dimethyl-2-methoxycarbonyl - 1 - cyclohexenyl phosphate (6.4 g., 0.024 mole) in 50 ml. of carbon tetrachloride for 25 minutes at room temperature with external cooling. After standing overnight, a stream of nitrogen was bubbled through the reaction mixture to remove excess chlorine and hydrogen chloride formed during the reaction. The solvent was removed at reduced pressure, and the residue obtained was held at 80° C./0.1 mm. for one hour. The product (8.9 g.) was a viscous, pale yellow, clear oil; $n_D^{20}$ 1.5018. The following analytical data revealed that O,O-dimethyl-2-methoxycarbonyl-1-(1,2,X-trichlorocyclohexyl) phosphate had been obtained. Yield: 100%.

*Analysis.*—Calcd. for $C_{10}H_{16}Cl_1O_6P$: C, 32.50; H, 4.64; Cl, 28.78; P, 8.38. Found: C, 31.65; H, 4.10; Cl, 29.10; P, 8.52.

EXAMPLE 4

Excess chlorine gas was slowly bubbled into a solution of O-methyl-2-methoxycarbonyl - 1 - cyclopentenyl-methylphosphonate (1.82 g., 0.08 mole) in 20 ml. of carbon tetrachloride for 20 minutes at room temperature with external cooling. The solution finally became deep yellow in color and retained this color on standing overnight. Nitrogen was passed through the solution to remove excess chlorine and hydrogen chloride which had been formed. Then the solvent was removed, first at reduced pressure and finally by maintaining the residue for 2 hours at 90° C./0.1 mm. The amount of 2.2 g. of a clear, gold-colored oil remained; $n_D^{20}$ 1.4918. The following analytical data revealed that O-methyl-2-methoxycarbonyl - 1 - (1,2,X - trichlorocyclopentyl) methylphosphonate had been obtained. Yield: 84.6%.

*Analysis.*—Calcd. for $C_9H_{14}Cl_3O_5P$: C, 31.84; H, 4.16; Cl, 31.33; P, 9.12. Found: C, 31.92; H, 4.19; Cl, 30.6; P, 8.95.

EXAMPLE 5

A stream of chlorine gas was passed into a solution of O,O-diethyl-2-ethoxycarbonyl-1-cyclopentenyl phosphate (5.84 g., 0.02 mole) in 60 ml. of carbon tetrachloride for ten minutes while the reaction temperature was maintained at 25°–30° C. by the use of an external cooling bath. Chlorine was consumed and evolution of hydrogen chloride was observed. The chlorine gas was passed into the solution until a deep yellow color persisted. After three days standing at room temperature, excess chlorine was removed by purging with nitrogen. The solvent was distilled at reduced pressure and the residual oily product was held in a 0.1 mm. vacuum at 100° C. for five minutes. A pale yellow oil (7.96 g.) was obtained; $n_D^{20}$ 1.4774. The infrared spectrum of this product showed the complete elimination of the absorption band noted at 6.08μ in the starting material and assigned to the cyclic double bond. The following analytical data revealed that O,O-diethyl - 2 - ethoxycarbonyl-1-(1,2,X-trichlorocyclopentyl) phosphate had been obtained. Yield: 100%.

*Analysis.*—Calcd. for $C_{12}H_{20}Cl_3O_6P$: C, 36.25; H, 5.07; Cl, 26.75; P, 7.79. Found: C, 35.08; H, 4.81; Cl, 27.8; P, 7.97.

EXAMPLE 6

A stream of chlorine gas was passed into a solution of 2.1 g. of O-methyl-2-methoxycarbonyl-1-cyclopentenyl chloromethylphosphonate, prepared by the reaction of equimolar amounts of sodium 2-carbomethoxycyclopentenolate and methyl chloromethylphosphonyl chloride in 25 ml. of carbon tetrachloride for fifteen minutes with ice cooling. A deep yellow color developed in the solution during this period. After standing overnight, a stream of nitrogen was bubbled through the solution until the solution was almost colorless. The solvent was removed by rotary evaporation and then the residue was maintained at 0.1 mm. pressure for three hours. A clear orange liquid (3.2 g.) resulted. Infrared spectroscopy revealed the formation of a compound containing three chlorine atoms in the cyclopentane ring. The total chlorine content approaches 37.9%, the value calculated for O-methyl - 2 - methoxycarbonyl-1-(1,2,X-trichlorocyclopentyl) chloromethylphosphonate.

What is claimed is:

1. Organophosphorus compounds having the formula

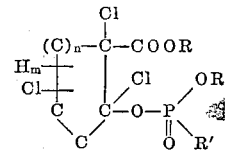

where R is lower alkyl; R' is lower alkyl, lower alkoxy, or chloromethyl; $n$ is an integer from 1–2, and $m$ is 5 or 7 being 5 when $n$ is 1 and 7 when $n$ is 2.

2. Trichlorocyclopentyl phosphates having the formula of claim 1 wherein $n$ is 1 and R' is lower alkoxy.

3. O,O-dimethyl-2-methoxycarbonyl-1-(1,2,X-trichlorocyclopentyl) phosphate.

4. O,O-diethyl - 2 - ethoxycarbonyl-1-(1,2,X-trichlorocyclopentyl) phosphate.

5. Trichlorocyclohexyl phosphates having the formula of claim 1 wherein $n$ is 2 and R' is lower alkoxy.

6. O,O-dimethyl-2-methoxycarbonyl-1-(1,2,X-trichlorocyclohexyl) phosphate.

7. Trichlorocyclopentyl phosphonates having the formula of claim 1 wherein $n$ is 1 and R' is lower alkyl.

8. Trichlorocyclopentyl phosphonates having the formula of claim 1 wherein $n$ is 1 and R' is chloromethyl.

9. A process for preparing trichlorocyclopentyl and trichlorocyclohexyl phosphates and phosphonates which comprises reacting cyclic vinyl phosphates and phosphonates having the general formula

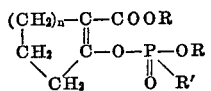

where R is lower alkyl; R' is lower alkyl, lower alkoxy, or chloromethyl; and $n$ is an integer from 1–2, with chlorine at a temperature range of 0° to 150° C.

10. The process of claim 9 wherein the chlorination is performed in the presence of an inert diluent.

References Cited

UNITED STATES PATENTS 3,080,417  3/1963  Rosen _____ 260—968 XR

CHARLES B. PARKER, *Primary Examiner.*

A. H. SUTTO, *Assistant Examiner.*

U.S. Cl. X.R.

260—986, 973, 999